April 14, 1936.   V. H. BODLE   2,037,113
METHOD AND APPARATUS FOR FORMING RUBBER ARTICLES
Filed Jan. 24, 1934
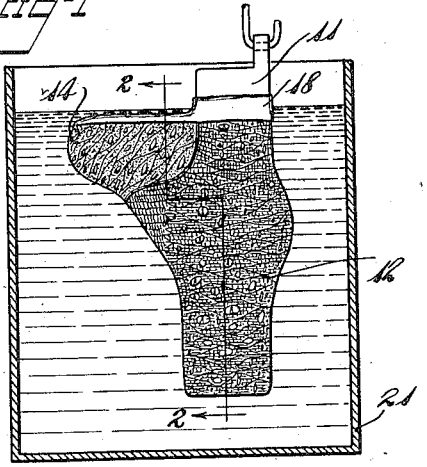
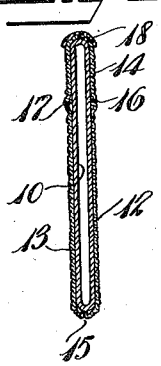
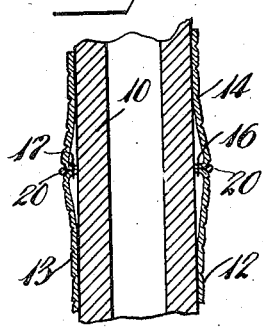
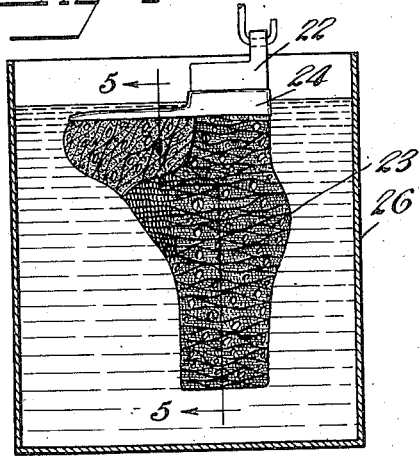
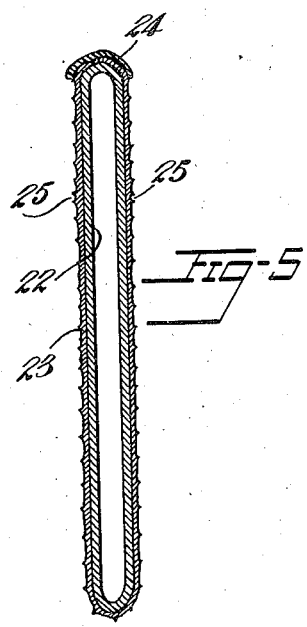
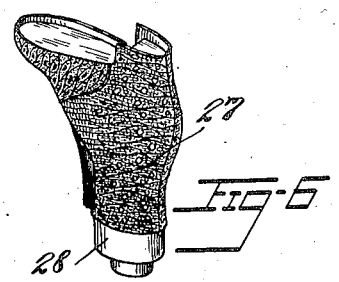
Inventor
Virgil H. Bodle
By Eakin & Avery
Attys.

Patented Apr. 14, 1936

2,037,113

UNITED STATES PATENT OFFICE 2,037,113

METHOD AND APPARATUS FOR FORMING RUBBER ARTICLES

Virgil H. Bodle, Newton, Mass., assignor to Hood Rubber Company, Inc., Watertown, Mass., a corporation of Delaware Application January 24, 1934, Serial No. 708,105

2 Claims. (Cl. 18—41)

This invention relates to the manufacture of formed rubber articles, especially such articles as footwear.

Rubber footwear has for a long time been formed upon a foot-shaped last by building sheet rubber parts onto such last to assemble and form the article, and more recently such articles have been made by a procedure which has comprised molding a layer of rubber against a foot-shaped form to provide a foot-shaped layer which has been turned inside out and finally shaped and vulcanized upon another foot-shaped last. In the last mentioned procedure the foot-shaped forms upon which the rubber has been deposited have in some instances been prepared by a procedure involving the building upon a foot-shaped support of a matrix surface of leather or sheet rubber reproductions of leather or other desired surface, such sheet material having been carefully cut and sewn to fit the complex curves of the foot-shaped support, a procedure requiring considerable skillful effort. Also, the foot-shaped forms could be grouped only with considerable waste space between them, requiring considerable space for the handling of them on a manufacturing scale and bulky tanks for dipping groups of the forms in the liquid dispersed rubber.

The chief objects of this invention are to provide for greater convenience and economy in the preparation and handling of the forms, to provide for the simultaneous dipping of a larger number of forms in a bath of a given size, and to provide at the same time for producing neatly and accurately shaped final articles.

These and further objects will be apparent from the following description, reference being had to the accompanying drawing in which:

Fig. 1 is a vertical section of a dipping tank having suspended therein a male-positive form constructed and utilized in accordance with the invention in its preferred form.

Fig. 2 is a section taken along the line 2—2 of Fig. 1.

Fig. 3 is an enlarged view of a portion of Fig. 2.

Fig. 4 is a view similar to Fig. 1 but showing a male-negative form produced from the positive form of Fig. 1.

Fig. 5 is an enlarged section taken along the line 5—5 of Fig. 4.

Fig. 6 is a perspective view of a foot-shaped last having shaped upon it a male-positive matrix layer produced from the negative form of Fig. 4.

According to the preferred form of the invention a rigid form support 10 of metal or any other suitable material is provided, this support being of only approximate foot-shape, having flat sides with rounded edges, being relatively thin and having a surface area sufficient to cover the desired foot shape, the outline and dimensions preferably being such that the peripheries of horizontal sections of it in the position of Fig. 1 will equal substantially the peripheries of horizontal sections taken at corresponding levels of a form of the desired foot-shape so that a covering molded upon the flat form can be subsequently shaped upon the foot-shaped form with a minimum of objectionable stretching to effect the shaping. At one end, preferably the heel end, the form is provided with an extension 11 to facilitate handling and suspension of it.

Upon this support is mounted a matrix, preferably in the form of a sock-like structure comprising pieces 12, 13 and 14 of flexible sheet material such as leather or sheet rubber, desirably though not necessarily vulcanized, having a desired positive design formed in its surface. The pieces 12, 13 and 14 may be secured to the support by adhesion but preferably are sewn together at seams 15, 16 and 17 to fit the support snugly in the manner of a sock. The upper end of the sock structure may be closed by a rubber tape 18 adhesively binding the margin of the sock onto the support. If desired, a decorative bead element 20 may be secured in the seams 16 and 17, the surface configuration of which, along with the surface form of the sock, will be reproduced in the final article.

From the male-positive form of Figs. 1 to 3 the male-negative form of Figs. 4 and 5 is produced. This is effected by molding upon the form of Fig. 1 a layer of rubber all around it, preferably by dipping the positive form in a tank 21 of liquid dispersed rubber to deposit the rubber upon it, desirably with the aid of a coagulant. The deposited rubber layer thus produced is then opened at its upper, larger end and is stripped from the form and mounted inside out upon a second support 22, identical with support 10, to provide a male-negative matrix 23. The rubber of this matrix is preferably of a hard rubber compound so that by vulcanizing it upon the support 22, the form may be made rigid throughout. The upper end of the rubber matrix may be closed and bound to the support by means of a tape 24 applied before or after the vulcanization. The surface of this form being negative, the portion corresponding to the seam-bead 20 of the positive form will appear as a groove 25.

A layer of rubber is then deposited upon the matrix 23, as by dipping the form in a tank 26 of liquid dispersed rubber to provide a layer having molded in its surface a positive reproduction of the design, which layer, when stripped from the matrix and turned inside out, constitutes a male-positive reproduction 27 (Fig. 5) of the sock of Fig. 1. The male-positive layer is suitably trimmed at its ends, slit at the front, and is shaped upon a foot-shaped last 28 to provide a shoe upper. The various other shoe components, such as the insole and outsole and lining are assembled with it upon the last in any desired manner and the whole then vulcanized upon the last, whereupon all parts will have the desired final shape.

In some cases, if desired, the sock structure of the first flat form may be built up of negative surfaced sheet material, and the final positive article produced directly from this matrix. The preferred procedure described above is better suited to large scale manufacture, however, as a greater number of high quality reproductions of the original designed surface is made possible, by the use of the intermediate, male-negative form. This and other variations may be made without departing from the scope of the invention as it is hereinafter claimed.

I claim:

1. The method of making the foot covering portion of an article of rubber footwear which comprises depositing rubber from a liquid dispersion of rubber upon a form and thereby producing a hollow rubber blank having an intricate surface design on its inner face and of a shape radically different in relative dimensions from that of the final article and relatively narrow throughout as viewed from any point in an extension of its medial plane but of a total area approximately equal to its area in the finished article, removing the blank from the form and turning it inside out so that the surface design is then on its exterior, then giving the blank its final shape as a part of the finished article and vulcanizing it in such shape, the original and final areas of the blank being so nearly equal that the surface design is not substantially distorted in changing the blank from its original to its final shape.

2. A dipping form for producing a rubber blank for the foot-covering portion of an article of rubber footwear, said form being, as viewed from any point in an extension of its medial plane, substantially narrower throughout its extent than the corresponding part of the finished article of footwear and of such girth at all positions along its length that its total area is approximately the same as that of the corresponding part of the finished article of footwear, said form having a surface design thereon and its shape being such that a rubber blank formed thereon can be reshaped to its final form in the finished article of footwear without harmful stretching of any part of the blank.

VIRGIL H. BODLE.